July 9, 1929.   J. GUILLEMIN-TARAYRE   1,720,249
FLUID PRESSURE BRAKE
Filed Nov. 4, 1927   2 Sheets-Sheet 2
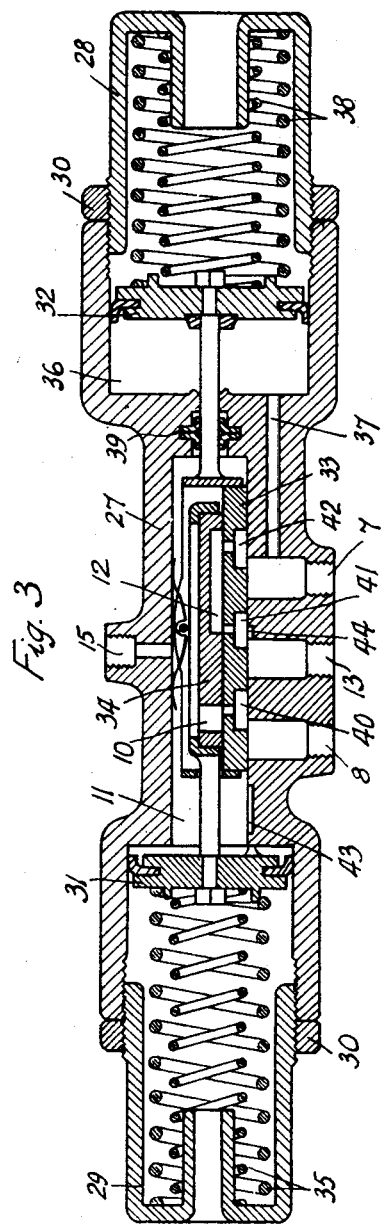
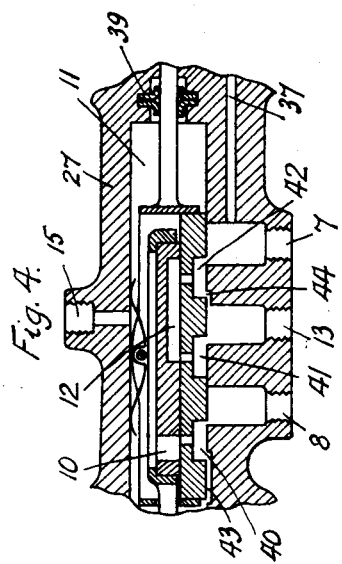
INVENTOR
JEAN GUILLEMIN-TARAYRE
BY
Wm. M. Cady
ATTORNEY Patented July 9, 1929.

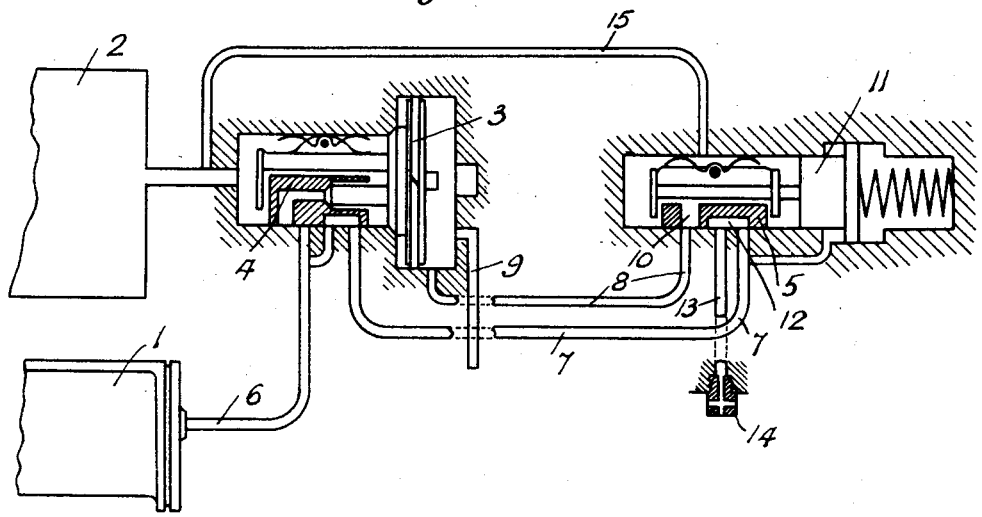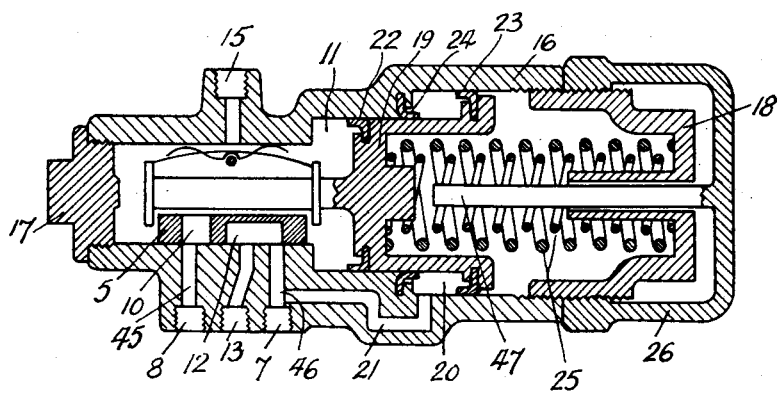

1,720,249

UNITED STATES PATENT OFFICE.

JEAN GUILLEMIN-TARAYRE, OF VILLEMOMBLE, FRANCE, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed November 4, 1927, Serial No. 230,984, and in Great Britain November 10, 1926.

This invention relates to fluid pressure braking apparatus and has for its object to provide arrangements for improving the operation of apparatus of this character and ensuring greater safety in operation.

In some fluid pressure braking apparatus a certain quantity of energy which may be utilized, when required, to produce a more or less powerful braking effort, is stored.

In order however to ensure safety it is essential that the quantity or mass of stored fluid under pressure should be maintained the same at any moment.

This condition is absolutely fulfilled by apparatus of the kind comprising a reservoir adapted to be connected to a brake cylinder by a distributing device during the first complete application of the brakes effected in a continuous or graduated manner. In practice, the initial energy constituted by a volume of fluid under pressure stored in a reservoir, is utilized in a cylinder placed in communication therewith, and as the reservoir and cylinder are connected together in a fluid tight manner, the equalization pressure corresponds to the maximum braking effort which can be obtained.

At any instant during braking, the total mass of fluid contained in the reservoir and cylinder is equal to that initially contained before effecting an application of the brakes, in the reservoir alone, and therefore at any instant while fluid is passing from the reservoir to the cylinder, a given pressure obtaining in the cylinder corresponds to a given pressure in the reservoir.

In order that the braking apparatus shall at any instant possess its initial mass or quantity of fluid, correspondence between the pressures obtaining in the reservoir and cylinder should be maintained under whatever conditions the braking apparatus is being employed.

It is a well known fact, in connection with long goods trains, that serious difficulties are experienced, when running, in maintaining the quantity of stored energy, this being the case particularly on inclines.

Not one of the various known distributing devices overcomes this difficulty, the braking apparatus either losing in power by reason of the fact that during release the quantity of fluid which is released from the cylinder may be greater than that introduced into the reservoir, or gaining in power by reason of the fact that a greater quantity of fluid than that released from the cylinder may be introduced into the reservoir during release.

It will readily be understood that the first alternative constitutes a serious danger, while serious disadvantages, the chief of which are as follows, arise as a consequence of the second alternative:—

Firstly, the release of the brakes throughout the train is liable to be very unequal;

Secondly, an excess of power may result in braking efforts great enough to cause sliding of the wheels.

Thirdly, the storing on certain vehicles of an excess of power frequency causes a deficit of power on certain other vehicles, and always has a detrimental effect on the recharging and release of vehicles at some distance from the source of supply, as in this case the driver cannot readily utilize the maximum recharging power at his disposal for fear of the above-mentioned difficulties.

One of the objects of the present invention, therefore, is to provide a device which shall ensure when releasing, and consequently at any given moment, mutual correspondence between the pressures obtaining in the cylinder and in the reservoir, that is to say to arrange that during release the pressure obtaining in the reservoir shall be the same as that obtaining therein during braking, for each pressure obtaining in the cylinder.

The device which it is therefore proposed to provide is so designed that if during the first application of the brakes effected the pressure obtaining in the cylinder is $p$ when the pressure obtaining in the reservoir is P, then during release the same pressure $p$ is attained in the cylinder when the pressure obtaining in the reservoir attains the value P above mentioned.

If during release, the pressure in the reservoir is maintained at the value P, on account of the train pipe not being recharged, the device constituting the main object of the invention will function to maintain the pressure obtaining in the cylinder at a value $p$, by preventing, for the moment, the release of fluid from the cylinder.

Similarly, and this is one of the most important features of the device, if the pressure in the reservoir should tend to rise by reason of a rapid recharging of the train pipe above the pressure P when the pressure obtaining in the cylinder has still a value greater than $p$, the device will prevent the further charging of the reservoir whilst permitting the release of the cylinder, and then permit further charging of the reservoir when the pressures obtaining in the cylinder and reservoir respectively have attained values corresponding to the normal condition of the braking apparatus.

The objects which it is proposed to achieve by the device constructed according to the invention, are:—

Firstly to render the braking apparatus capable of graduation by preventing the release of fluid from the cylinder when the pressure in the reservoir ceases to rise.

Secondly to permit rapid recharging of the train pipe without fear of overcharging the vehicles at the head of a train and ensure on account of the possibility of rapid recharging and on account of the inability of the vehicles at the head of the train to store an excess of air, a more rapid propagation of the release along the train and a more efficient recharging of the rear vehicles.

Thirdly, to permit the recharging of the reservoirs without causing the release of the brakes of vehicles on which leakage from the cylinder may have abnormally decreased the pressure obtained therein.

Fourthly, in view of the fact that the recharging of the reservoirs is dependent upon the release of fluid from the cylinders, the release of fluid taking place in a uniform manner on all the vehicles of the train, to ensure, during a rapid release, a more uniform charging of the reservoirs on the vehicles, independently of their position in the train.

Lastly to ensure absolutely that the store of energy in the braking apparatus is inexhaustible.

Some methods of ensuring mutual correspondence between the pressures obtaining simultaneously in the reservoir and the cylinder will now be indicated by way of example.

The devices described hereinafter are based on two different principles.

The first device utilizes the simultaneous action of the two pressures considered above on the surfaces of a single piston and on the same side of the piston to balance an opposing spring a distributing device being operated by this piston for controlling the charging of the auxiliary reservoir and the release of fluid from the brake cylinder.

As soon as equilibrium of pressure on the piston is destroyed, the distributing device is displaced and automatically cuts off the flow of fluid which has gained on the other.

The second device utilizes the simultaneous action of the two pressures considered above on two different pistons acting respectively against opposing springs.

Under the influence of the pressure obtaining in the auxiliary reservoir, which pressure is increasing with time, the corresponding piston is displaced compressing its opposing spring and under the influence of the pressure obtaining in the cylinder, which pressure is decreasing with time, the corresponding piston is displaced under the action of its opposing spring.

The displacements of the pistons being proportional to the variations in pressures acting thereon between two given instants, the distances traversed by these pistons will also be proportional.

As long as the flow of fluid is at a predetermined rate, the distance between the pistons will remain constant, and consequently the distributing devices actuated by each of the pistons will not be subjected to any relative movement. When this is not the case differential movement of the two distributing devices is utilized to cut off the flow of fluid which is in advance of the other.

The invention will now be described, by way of example, with reference to the drawings accompanying the provisional specification, Figure 1 of these drawings being a general diagrammatic view of the braking apparatus.

Figure 2 illustrating one constructional form of the release regulating valve device shown in Figure 1, and Figures 3 and 4 illustrating another constructional form of release regulating valve device.

Referring now to Figure 1, 1 is the brake cylinder, 2 the auxiliary reservoir, 3 the piston of the triple valve, 4 the slide valve of the triple valve and 5 the slide valve of a double release regulating valve device.

The cylinder 1 is connected to the triple valve through a conduit 6 and the triple valve is connected to the regulating valve device through a conduit 8 which serves for the passage of fluid under pressure from the train pipe 9 to recharge the reservoir 2. In the present example the usual feed groove has been omitted, the air flowing to the reservoir always traversing the release regulating valve device.

The slide valve of the release regulating valve device has an aperture 10 therein connecting the conduit 8 to a chamber 11, a cavity 12 serving to connect a conduit 7 with a conduit 13 provided with an exhaust connection 14 and the chamber 11 of the regulating device being connected to the auxiliary reservoir 2 through a conduit 15.

Referring now to Figure 2, this figure illustrates a device based on the principle of the maintaining constant of the sum of the simultaneous actions of the pressures obtaining in the cylinder and reservoir respectively on a single piston adapted to actuate a slide valve. The body portion of the valve is constituted by two elements 16 and 18 and pipe connections to which are connected conduits 8, 13, 7 and 15, 8 leading from the triple valve for charging the reservoir, 13 leading to the exhaust connection, 7 leading from the triple valve for the exhaust of fluid from the cylinder, and 15 leading to the auxiliary reservoir for recharging the latter.

The body portion 16 contains a piston 19 the left face of which is subject in the chamber 11 to the pressure obtaining in the auxiliary reservoir, and in the chamber 20 to the pressure obtaining in the brake cylinder through passage 21.

The piston 19 is provided with two leather packings 22 and 23, and the body portion 16 is provided with a packing 24.

The slide valve 5 is adapted to be operated by the piston 19 and has an aperture 10 therein which normally places the conduit 8 in communication with the chamber 11, a cavity 12 placing the passages 7 and 13 in communication with one another.

The piston 19 is subject on its right face to the effort exerted by one or more springs 25 the compression of which may be regulated by means of the element 18 secured by an element 26. The latter comprises a rod 47, which serves as an abutment for the piston 19 upon movement of the piston to the right.

In Figure 3 is illustrated a device based on the principle of the maintenance of a constant distance between two pistons which are subject simultaneously and respectively to the pressures obtaining in the reservoir and cylinder.

It comprises a body portion 27 having adjustable elements 28 and 29 adapted to be secured by elements 30, and four pipe connections adapted to be connected to conduits 7, 8, 13 and 15, as described above.

The body portion 27 moreover contains two pistons 31 and 32 controlling respectively the superposed slide valves 34 and 33. The piston 31 is subject on its right face to the pressure obtaining in the auxiliary reservoir and consequently in the chamber 11, and is subject on its left face to the effort exerted by one or more springs 35.

The piston 32 is subject on its left face, in the chamber 36 to the pressure obtaining in the brake cylinder which is transmitted to it through passages 6, 7 and 37, and is subject on its right face to the effort exerted by one or more springs 38, an element 39 separating the chambers 11 and 36. The slide valve 33 has three apertures therein, 40, which serves for the passage of fluid under pressure to recharge the reservoir, and 41 and 42 which permit of the passage of fluid from the cylinder to the exhaust element.

The seat of the slide valve 33 has two grooves 43 and 44 therein, the first of which serves for charging the reservoir, and the second for releasing fluid under pressure from the cylinder when the two slide valves 33 and 34 have reached the end of their stroke to the left, this position corresponding to the position illustrated in Figure 4, where the auxiliary reservoir is being recharged and fluid being vented from the cylinder.

The slide valve 34 has an aperture 10 therein connecting the aperture 40 with the chamber 11 and a cavity 12 connecting apertures 41 and 42.

The operation of the apparatus illustrated in Figures 1 and 2 is as follows:—

During release the chamber 11 of the regulating valve is supplied with fluid under pressure from the train pipe 9 through the triple valve, through passage 8 and port 10. The passage 8 has a port 45 of predetermined size in the body of the regulating valve, the cross sectional area of which port is substantially equal to that of the usual feed groove.

The regulating valve is also supplied with fluid from the brake cylinder through conduit 7, this fluid flowing through passage 21 into chamber 20 and through cavity 12 into the pipe 13 to the exhaust element 14. As long as the piston 19 is in equilibrium, under the simultaneous pressures of the reservoir and of the cylinder, which pressures obtain in the chambers 11 and 20 on the left face of the piston 19, and the pressures of the springs 25 which act on the right face of the piston, the continuity of the two supplies of fluid is maintained according to predetermined conditions.

As soon as the action of the total fluid pressures on the piston 19 however differs from the pressure exerted by the springs 25, the piston is moved and the slide valve interrupts one or other of the supplies of fluid.

In the case in which the recharging of the auxiliary reservoir tends to become too rapid, the slide valve moves to the right, and closes the port 45, the supply of fluid to the reservoir being interrupted, and the exhaust of fluid from the cylinder continuing until equilibrium is again established between the fluid pressures and the effort exerted by the springs 25 whereupon the slide valve will reassume its normal position.

If on the contrary, the supply of fluid to the reservoir should tend to become too slow, the piston will be moved to the left and will close the port 46. The release of the brake will be momentarily arrested until the supply of fluid to the reservoir together with the pressure remaining in the cylinder, is sufficient to permit the piston to be moved to its normal position.

The springs 25 are arranged to be controlled by means of element 18 so that for example they permit equilibrium with the pressures of 0.800 kgs. in the cylinder and 4.600 kgs. in the reservoir and 3.500 kgs. in the cylinder and 3.500 kgs. in the reservoir.

In Figure 2, for the sake of simplicity, the aperture 10 and the cavity 12 are shown in the same plane whereas in practice these would be arranged in two parallel planes, the cavity 12 being elongated. In case of rupture or of too great compression of the spring 25, the slide valve being displaced too much to the right, would uncover the port 45 and maintain through cavity 12, communication between conduit 7 and 13, thus ensuring the continuity of the two supplies of fluid as if the regulating valve did not exist.

The device illustrated in Figures 3 and 4 is based on the principle of maintaining a constant distance between the pistons and operates as follows:—

During release the chamber 11 of the regulating device is supplied through the triple valve with fluid from the train pipe through passage 8, and apertures 40 and 10, fluid from the cylinder being supplied through passages 7 and 37 to the chamber 36 so that the piston 31 is moved to the left, and piston 32 to the right.

The areas of the pistons being predetermined, the opposing springs 35 and 38 are so regulated that the slide valves permit for example the two supplies of fluid under the following pressure conditions:—

0.800 kgs. in the cylinder and 4.600 kgs. in the reservoir and 3.500 kgs. in the cylinder and 3.500 kgs. in the reservoir.

As long as the two supplies obey the predetermined law, the two pistons move to the left together with their slide valves, and the two supplies are thus maintained, but as soon as the supplies tend to depart from the law, the distance between the pistons varies and the slide valves are subjected to a relative movement which causes the closure, through the slide valve 34 either of the aperture 40, or the aperture 42. For example, in case of too rapid recharging the piston 31 is moved to the left more rapidly than the piston 32, and the upper slide valve 34 is moved to the left with respect to the lower slide valve 33, the aperture 40 being closed whilst the exhaust of fluid from the cylinder still takes place through cavity 12.

On the contrary, in the case of insufficient recharging, the piston 32 moves to the left more rapidly than the piston 31, and slide valve 33 slides under the slide valve 34, port 41 consequently being closed by slide valve 34, the exhaust of fluid from the cylinder thus being interrupted whilst the recharging of the reservoir continues.

When the reservoir is completely recharged, the two slide valves are in their extreme positions to the left as shown in Figure 4 and fluid for the reservoir can flow freely through the conduit 8 on the one hand through aperture 10 and on the other hand through the cavity 43. Moreover, the cylinder is connected permanently to the atmosphere through passage 7 and cavities 42 and 44 and through cavity 12 and aperture 41.

The devices described above have been found most suitable for carrying the invention into practice, but it is evident that alterations and modifications may be made therein, other elements being employed for the same purposes if required without exceeding the scope of the invention.

Having now described my invention, what I claim as new and desire to secure by Letters Patent, is:—

1. Fluid pressure braking apparatus of the kind comprising an auxiliary reservoir or other source of fluid under pressure and a brake cylinder to which fluid is supplied and released in response to variations in pressure in the train pipe, comprising arrangements for maintaining strict proportionality between the pressures obtaining in the brake cylinder and reservoir respectively during operation for the purpose specified.

2. Fluid pressure braking apparatus as claimed in claim 1, in which arrangements are provided for regulating the supply of fluid under pressure to the reservoir or other source of fluid pressure and the release of fluid under pressure from the brake cylinder in such a manner that a predetermined pressure in the reservoir or other source of fluid pressure corresponds to a predetermined pressure in the brake cylinder at any stage during the operation of the apparatus.

3. Fluid pressure braking apparatus as claimed in claim 1 in which a valve device is provided comprising an abutment subject to the pressures obtaining in the brake cylinder and the reservoir or other source of fluid pressure and adapted to regulate the supply of fluid under pressure to the reservoir and the release of fluid under pressure from the brake cylinder according to the predetermined proportionality between the pressures obtaining in the reservoir and brake cylinder.

4. Fluid pressure braking apparatus as claimed in claim 1 in which a valve device is provided comprising two abutments, one subject to the pressure obtaining in the reservoir or other source of fluid pressure and the other subject to the pressure obtaining in the brake cylinder, the two abutments being adapted to cooperate with one another in such a manner as to regulate the supply of fluid under pressure to the reservoir and the release of fluid under pressure from the brake cylinder, substantially as and for the purpose specified.

5. In a fluid pressure brake, the combination with a brake cylinder and auxiliary reservoir, of valve means for controlling the supply of fluid under pressure to the auxiliary reservoir, and the release of fluid from the brake cylinder in releasing the brakes, and means for maintaining the ratio between the auxiliary reservoir pressure and the brake cylinder pressure substantially constant in releasing the brakes.

6. In a fluid pressure brake, the combination with a brake cylinder and auxiliary reservoir, of valve means for controlling the supply of fluid under pressure to the auxiliary reservoir and the release of fluid from the brake cylinder, and means for operating said valve means so that a substantially constant ratio is maintained between the auxiliary reservoir and brake cylinder pressures in the supply of fluid to the auxiliary reservoir and the release of fluid from the brake cylinder.

7. In a fluid pressure brake, the combination with a brake cylinder and auxiliary reservoir, of valve means for controlling the supply of fluid under pressure to the auxiliary reservoir, and the release of fluid from the brake cylinder and movable in one direction to reduce the rate of flow to the auxiliary reservoir and in the opposite direction to restrict the exhaust of fluid from the brake cylinder, and a movable abutment subject to auxiliary reservoir and brake cylinder pressures for operating said valve means.

8. In a fluid pressure brake, the combination with a brake cylinder and auxiliary reservoir, of valve means for controlling the supply of fluid under pressure to the auxiliary reservoir, and the release of fluid from the brake cylinder and movable in one direction to reduce the rate of flow to the auxiliary reservoir and in the opposite direction to restrict the exhaust of fluid from the brake cylinder, and means subject on one side to a constant pressure and on the opposite side to auxiliary reservoir and brake cylinder pressures for operating said valve means.

9. In a fluid pressure brake, the combination with a brake cylinder and auxiliary reservoir, of valve means for controlling the supply of fluid under pressure to the auxiliary reservoir, and the release of fluid from the brake cylinder and movable in one direction to reduce the rate of flow to the auxiliary reservoir and in the opposite direction to restrict the exhaust of fluid from the brake cylinder, a spring, and a movable abutment subject in one direction to auxiliary reservoir and brake cylinder pressures and in the opposite direction to the pressure of said spring for operating said valve means.

In testimony whereof I have hereunto set my hand.

JEAN GUILLEMIN TARAYRE.